United States Patent [19]
Konig et al.

[11] 3,736,092
[45] May 29, 1973

[54] APPARATUS FOR TRANSMITTING MOTION TO MOLD SECTIONS IN INJECTION MOLDING MACHINES

[75] Inventors: Karl König, Munich; Ernst Würl, Weiboldshausen; Richard Herbst, Munich, all of Germany

[73] Assignee: Krauss-Maffei Aktiengesellschaft, Munich, Germany

[22] Filed: Apr. 8, 1971

[21] Appl. No.: 132,466

[30] Foreign Application Priority Data

Apr. 11, 1970 Germany..................P 20 17 476.9

[52] U.S. Cl..............................................425/450
[51] Int. Cl. ...............................................B29f 1/00
[58] Field of Search.....................425/450, 242, 247, 425/406, 408

[56] References Cited

UNITED STATES PATENTS

| | | | |
|---|---|---|---|
| 3,245,122 | 4/1966 | Maurer | 425/247 X |
| 3,015,131 | 1/1962 | Hehl | 425/450 |
| 3,179,981 | 4/1965 | Gravesen | 425/450 X |

FOREIGN PATENTS OR APPLICATIONS 863,974    3/1961    Great Britain......................425/242

*Primary Examiner*—J. Spencer Overholser
*Assistant Examiner*—David S. Safran
*Attorney*—Michael S. Striker

[57] ABSTRACT

Clamping apparatus for an injection molding machine wherein a movable platen is reciprocable between a fixed platen and a support for a stationary mold section has at least one pair of toggle links whose outer ends are pivoted to the two platens and whose inner ends are pivoted to each other, at least one pair of levers the outer ends of which are pivoted to the platens and the inner ends of which are pivoted to each other, and a hydraulic motor having a cylinder which is pivotally connected to at least one of the levers and a piston rod pivotally connected to the pin coupling the inner ends of the toggle links. When the movable platen is remote from the support, the toggle links make with each other an angle of less than 90° and the piston rod of the hydraulic motor makes with the tie rods for the movable platen an acute angle which is preferably less than 45°. This insures the generation of a substantial closing force as soon as the movable platen begins to advance toward the support and prevents excessive acceleration or deceleration of the movable platen during movement away from or toward the fixed platen.

17 Claims, 12 Drawing Figures

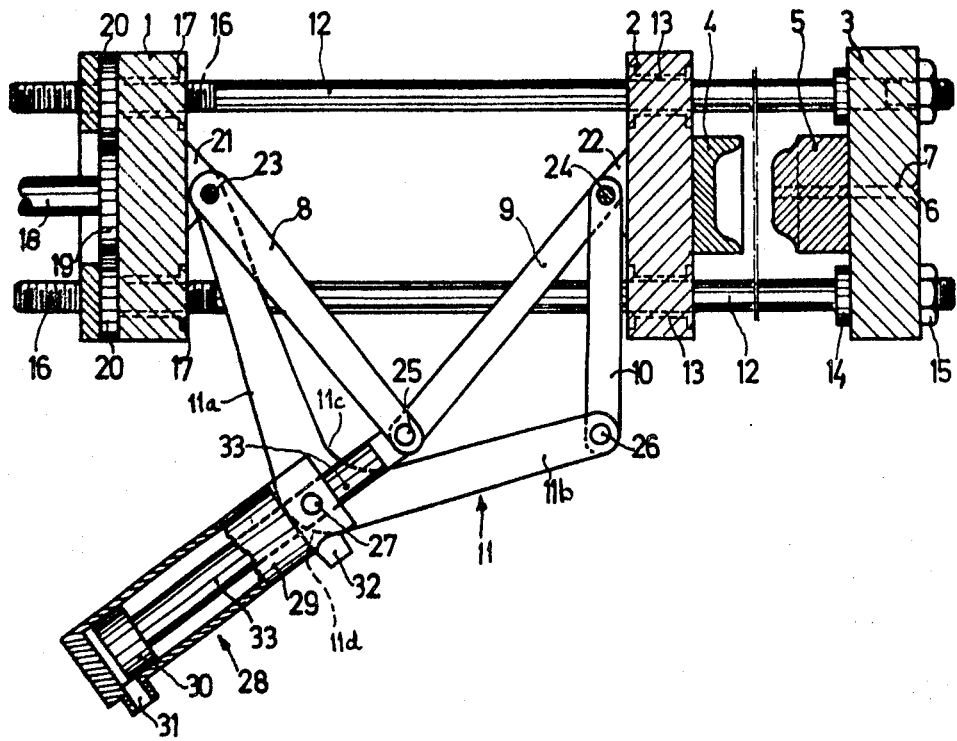
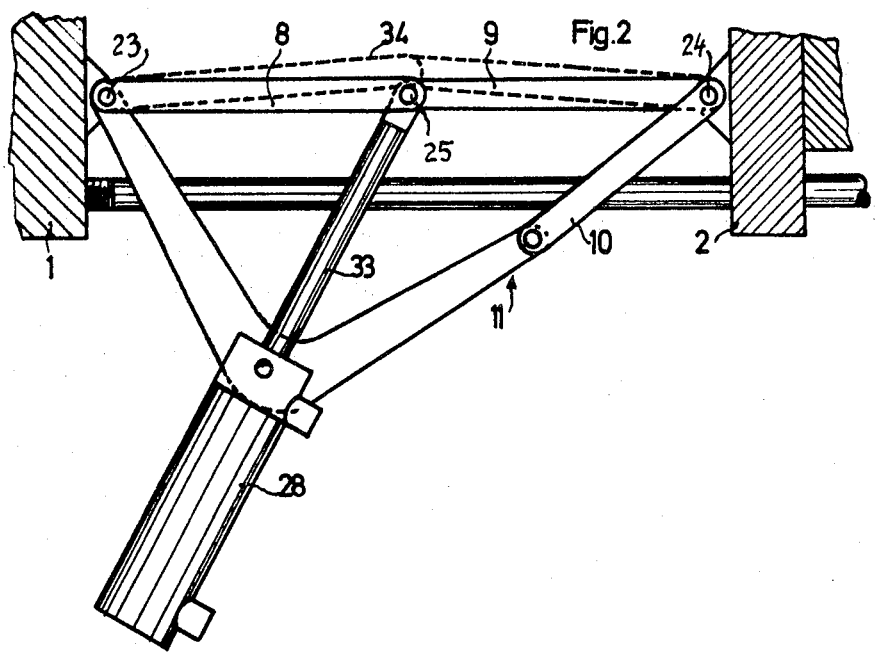

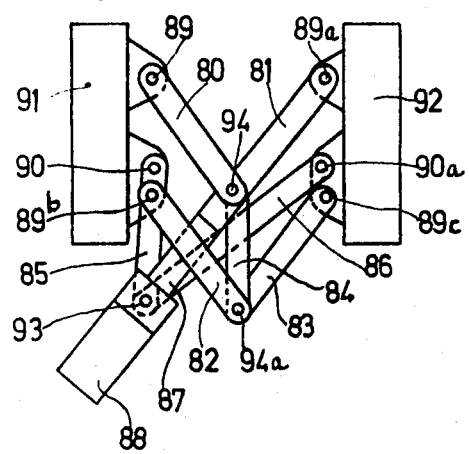
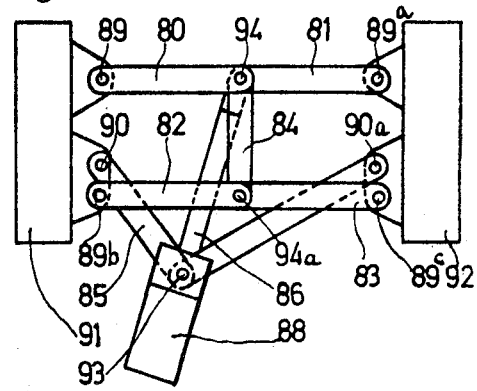
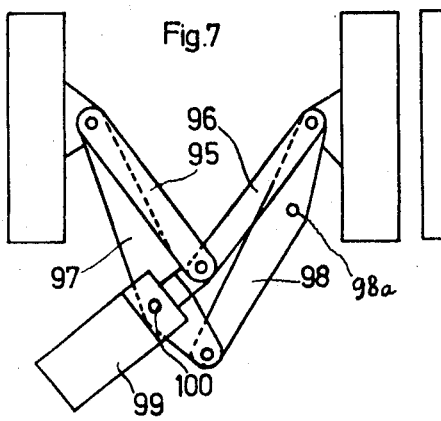
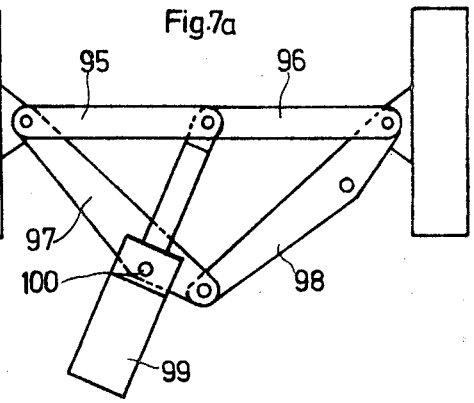
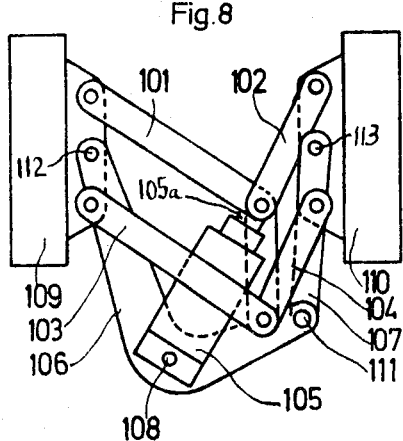
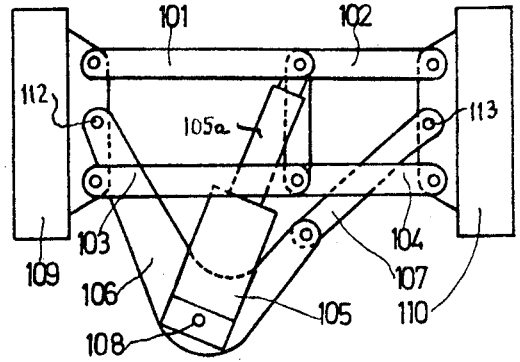

3,736,092

APPARATUS FOR TRANSMITTING MOTION TO MOLD SECTIONS IN INJECTION MOLDING MACHINES

BACKGROUND OF THE INVENTION

The present invention relates to improvements in clamping or motion transmitting apparatus which can be utilized in machines for the production of injection molded articles to maintain a movable mold section in a requisite clamping and sealing engagement with a second mold section. More particularly, the invention relates to improvements in clamping apparatus which can be used with particular advantage in injection molding machines for the production of articles consisting of synthetic plastic material and wherein a movable platen is reciprocable along tie rods extending between a stationary platen and a stationary support for a first mold section. The movable platen carries a second mold section which must be held in clamping and sealing engagement with the first mold section during injection and setting of plastic material in the mold cavity.

German Pat. No. 1,116,386 discloses a clamping apparatus which employs a pair of toggle links, two levers and a hydraulic cylinder and piston unit. The toggle links are pivoted to each other and to the two platens. The levers are pivoted to the two platens and to separate pins provided on the cylinder of the hydraulic unit. The axis of the cylinder is normal to the direction of reciprocatory movement of the movable platen and the piston rod of the hydraulic unit is coupled to a pivot pin which connects the two toggle links to each other.

A drawback of such clamping apparatus is that the movable platen is subjected to excessive accelerating and decelerating forces during movement toward and away from the first mold section. Furthermore, the variations in the magnitude of closing force which is furnished by the hydraulic unit and acts in a direction to urge the second mold section toward the first mold section are unsatisfactory, especially when the movable platen starts its movement from the fully retracted position in which the mold is open. Moreover, the ratio of movement of the piston rod to movement of the movable platen during the initial stage of movement of the piston rod is very unsatisfactory because a minute axial displacement of the piston rod must bring about a very substantial displacement of the movable platen. This contributes to the aforementioned unsatisfactory values of closing force during the initial and closing stages of operation of the patented clamping apparatus. A further drawback of the patented clamping apparatus is that the force with which the movable platen is drawn to its retracted position during the last stage of the return stroke of the movable platen in very small; this is undesirable because the ejection of shaped articles from the mold section on the movable platen normally takes place when the movable platen approaches its fully retracted position.

SUMMARY OF THE INVENTION

An object of the invention is to provide a novel and improved motion transmitting apparatus, particularly a clamping apparatus for the movable platen of an injection molding machine for the production of shaped articles consisting of synthetic plastic material, and to construct and assemble the apparatus in such a way that it can be readily installed in existing injection molding machines and is capable of furnishing more satisfactory closing, locking and opening forces than presently known clamping apparatus.

Another object of the invention is to provide a clamping apparatus which is constructed and assembled in such a way that it prevents undesirable acceleration and/or deceleration of the part or parts which receive motion therefrom, and which occupies less room and is more reliable, stronger and sturdier than presently known clamping apparatus having the same dimensions.

A further object of the invention is to provide a clamping apparatus which can furnish a satisfactory closing force as soon as the movable platen of an injection molding machine starts to leave its retracted position in which the mold is open.

An additional object of the invention is to provide a clamping apparatus which is capable of moving the movable platen with a substantial force during the last stage of return movement of such platen to the retracted position to thus insure that the movable platen cannot be decelerated or arrested during ejection of shaped articles from the cavity of the movable mold section by means of knockout pins or the like.

Another object of the invention is to provide a clamping apparatus which can insure uniform distribution of stresses on the platens and on the guide means for the movable platen.

A further object of the invention is to provide a clamping apparatus wherein the parts are interchangeable and wherein the number of different parts is relatively small to thus contribute to lower initial and maintenance cost.

An ancillary object of the invention is to provide a clamping apparatus wherein the parts are readily accessible to thus insure that the inspection, replacement and/or repair of parts can be completed with little loss in time.

The invention is embodied in a motion transmitting or clamping apparatus which is preferably used in an injection molding machine of the type having a first platen, elongated guide means preferably including several parallel tie rods which are connected to and extend from the first platen, and a second platen which carries a movable mold section and is movable along the guide means between a first position nearer to and a second position remote from the first platen. The mold is open in the first position and is closed in the second position of the second platen.

The clamping apparatus comprises first and second toggle links making with each other an angle of less than 90° in the first position of the second platen and having first or outer ends pivoted to the first and second platens and second or inner ends pivoted to each other to form a junction, a pair of levers having outer ends pivoted to the first and second platens and inner ends pivoted to each other, and a prime mover preferably including a hydraulic or pneumatic motor having a cylinder pivoted to at least one of the levers (preferably to that lever which is pivoted to the first platen) and a piston rod which is pivoted to the links at the aforementioned junction. The angle between the path of movement of the piston rod in the first position of the second platen and the path for movement of the second platen from the first to the second position is less than 90°, preferably less than 71° and most preferably less than 45°.

The second platen is caused to move to its second position in response to movement of the outer end of the piston rod (junction between the toggle links) away from the cylinder of the prime mover.

The novel features which are considered as characteristic of the invention are set forth in particular in the appended claims.

The improved clamping apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary longitudinal vertical sectional view of an injection molding machine and a side elevational view of a motion transmitting or clamping apparatus which is used to reciprocate a movable platen of the injection molding machine and is constructed and assembled in accordance with a first embodiment of the invention, the section of FIG. 1 being taken in the direction of arrows as seen from the line I—I of FIG. 3.

FIG. 2 illustrates the structure of FIG. 1 but with the movable platen in a different positon in which the sections of the mold are clamped against each other;

FIG. 6 is a fragmentary schematic side elevational view of an injection molding machine with the movable platen in a first position, and a side elevational view of a third clamping apparatus;

FIG. 6a illustrates the structure of FIG. 6 but with the movable platen in a second position;

FIG. 7 is a fragmentary schematic side elevational view of an injection molding machine with the movable platen in a first position, and a side elevational view of a fourth clamping apparatus;

FIG. 7a shows the structure of FIG. 7 but with the movable platen in a second position;

FIG. 8 is a fragmentary schematic side elevational view of an injection molding machine with the movable platen in a first position, and a side elevational view of a fifth clamping apparatus; and FIG. 8a illustrates the structure of FIG. 8 but with the movable platen in a second position.

DESCRIPTION OF THE PREFERRED EMBODIMENTS

Figure 3:
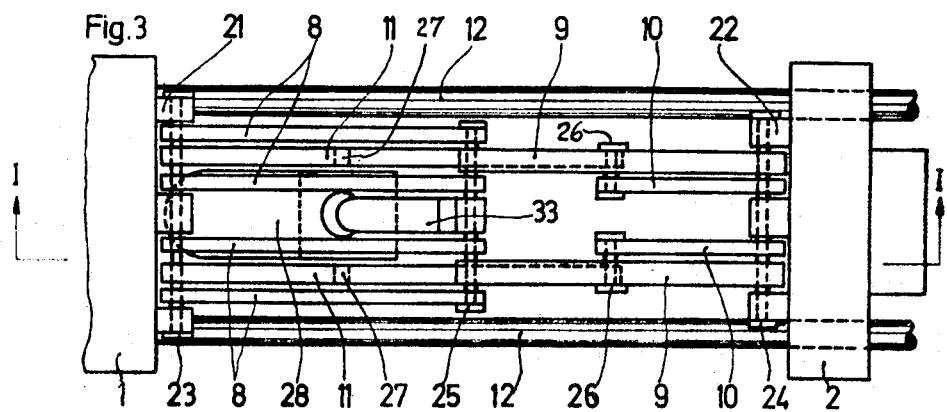
FIG. 3 is a plan view of the structure shown in FIG. 2.

Referring first to FIGS. 1 and 2, there is shown a portion of an injection molding machine including a stationary first platen 1, a stationary support 3 which is spaced from the platen 1, elongated guide means including four parallel horizontal tie rods 12 which are connected to and extend from the first platen 1 toward and through the support 3, and a movable second platen 2 which is mounted on the tie rods 12 and is reciprocable between a first position (shown in FIG. 1) nearer to and a second position (FIG. 2) remote from the first platen 1. The support 3 is fixedly connected with a mold section 5 which faces the second platen 2, and the second platen is fixedly connected with a complementary mold section 4 which faces the mold section 5. The mold section 4 is forced into sealing engagement with the mold section 5 when the platen 2 assumes the second position of FIG. 2.

The injection molding machine the parts of which are shown in FIGS. 1 and 2 is especially suited for use in the manufacture of shaped articles consisting of synthetic plastic material which is introduced in plasticized state through a mouth 6 provided in the right-hand side of the support 2 to flow through one or more channels 7 provided in the support 3 and mold section 5, and to fill one or more mold cavities which are defined by the mold sections 4, 5 in the second position of the movable platen 2. The thus injected plasticized material is then allowed or caused to set and the resulting shaped article or articles are expelled from the cavity by suitable knockout devices (not shown) not later than when the movable piston 2 is returned to the first position shown in FIG. 1 in which the mold is open. The mechanism for the plasticizing and for the injection of synthetic plastic material by way of the mouth 6 and channel or channels 7 is of known design and its construction and mode of operation form no part of this invention.

The invention resides in the provision of a novel motion transmitting or clamping apparatus which is utilized to move the platen 2 between the positions of FIGS. 1 and 2 and to hold the mold section 4 in the position of FIG. 2 during injection of plasticized material and during setting of such material in the mold cavity or cavities. The improved clamping apparatus comprises two toggle links 8, 9 of identical length which have first or outer ends respectively pivoted to the brackets 21, 22 of the platens 1, 2 by horizontal pivot pins 23, 24 and second or inner ends which are pivoted to each other to form a junction by means of a third horizontal pivot pin 25. It will be seen that, when the movable platen 2 dwells in the first position of FIG. 1, the angle between the toggle links 8 and 9 is less than 90°, for example, about 80°.

The motion transmitting or clamping apparatus further comprises a prime mover 28 and two additional links 10, 11 which will be called levers in order to avoid confusion with the toggle links 8 and 9. The lever 10 is a straight lever and one of its ends is articulately connected to the bracket 22 of the movable platen 2 for pivotal movement about the pin 24, i.e., about the pivot axis of the outer end of the toggle link 9. The other lever 11 is a bell crank having two substantially straight arms 11a, 11b which preferably make an angle of at least close to 90° and whose outer ends respectively constitute the first and second ends of the lever 11. The free end of the arm 11a is coupled to the bracket 21 to pivot about the axis of the pin 23, and the free end of the arm 11b is articulately connected to the inner end of the lever 10 by a pivot pin 26 which is parallel to the pivot pins 23, 24 and 25. Those edge faces 11c, 11d of the arms 11a, 11b which are remote from the pivot pins 23, 26 are of arcuate shape so that the lever 11 resembles a boomerang with the arm 11a slightly longer than the arm 11b.

The prime mover 28 is a hydraulically or pneumatically operated motor having a first portion or cylinder 29 which is articulately connected with an intermediate portion of the bell crank lever 11 by a horizontal pivot pin 27 parallel to the pins 23-26 and located in the region of the apex of the lever 11. The second portion of the prime mover 28 includes an elongated piston rod 33 and a piston 30 which is rigid with the inner end of the piston rod 33 and is reciprocable in the cylinder 29 between two fluid-conveying ports 31, 32. The cylinder 29 is of the double-acting type, i.e., the piston rod 33 is expelled to move the platen 2 to the second position of FIG. 2 in response to admission of a pressurized fluid by way of the port 31, and the piston rod 33 is retracted to return the platen 2 to the first position of FIG. 1 in response to admission of pressurized fluid by way of the port 32.

In accordance with a further feature of the invention, the direction of movement of the piston rod 33 (i.e., the path of movement of the pivot pin 25 at the junction between the toggle links 8, 9) and the direction of movement of the movable platen 2 from the first position shown in FIG. 1 (i.e., the straight line path defined for the platen 2 by the tie rods 12) make an acute angle which is preferably less than 71° and most preferably less than 45°. In the embodiment of FIGS. 1 and 2, the angle between the straight line path for the platen 2 (for movement from the position of FIG. 1 toward the position of FIG. 2) and the path for the piston rod 33 is about 37.5°.

FIG. 1 further shows that the movable platen 2 is provided with bearing sleeves 13 which surround the tie rods 12 and that the end portions of the tie rods 12 are provided with external threads. Furthermore, the tie rods 12 have flanges 14 which abut against the left-hand face of the support 3 and the tie rods mesh with nuts 15 which abut against the right-hand face of the support 3. The externally threaded left-hand end portions 16 of the tie rods 12 mesh with nuts 17 which are rotatably mounted in the stationary platen 1, and such rotary nuts are connected with gears 20 meshing with a gear 19 on a horizontal adjusting shaft 18. The latter can be rotated by a handwheel or by a servomotor (not shown) to move the platen 1 nearer to or further away from the support 3. Such adjustment might become necessary when the mold sections 4, 5 are replaced with larger or smaller mold sections and/or when it is necessary to move the platen 2 to the left beyond the first position shown in FIG. 1.

The bearing brackets 21, 22 are disposed substantially midway between the upper and lower tie rods 12, i.e., in the region of the resultant of forces which tend to move the platen 2 away from the second position shown in FIG. 2 during injection and setting of plastic material in the cavity of the mold. When the movable platen 2 assumes the position of FIG. 2, the toggle links 8, 9 are aligned or substantially aligned as shown in FIG. 2 by solid lines. Thus, the axis of the pivot pin 25 is then located in or close to the common plane of the axes of pivot pins 23, 24. If desired, the piston rod 33 can be moved outwardly beyond the solid-line position of FIG. 2 to maintain the toggle links 8, 9 in positions 34 which are indicated in FIG. 2 by broken lines. This insures that the prime mover 28 cannot be subjected to any appreciable stresses during injection of plasticized synthetic material into the mold cavity. The platen 1 is stationary while the platen 2 is moved by the links 8, 9 and levers 10, 11 so that it acts as a component against which the parts 8, 11 react during application of the closing and sealing forces.

The distance between the pivot pins 23, 26 (effective length of the bell crank lever 11) exceeds the distance between the pivot pins 24, 26 (effective length of the lever 10).

FIG. 3 illustrates the structure of FIG. 2 in a plan view, i.e., with the movable platen 2 in the second position. It will be noted that the motion transmitting or clamping apparatus may comprise as many as four toggle links 8, two toggle links 9, two bell crank levers 11 and two stright levers 10. This insures more uniform distribution of stresses and enables the apparatus to transmit substantial closing and sealing forces without excessive stressing of the pivot pins and/or tie rods. As shown, each of the bearing brackets 21, 22 may consist of several aligned portions which support the ends and median portions of the respective pivot pins 23, 24. The structure of FIG. 3 employs two discrete coaxial pivot pins 26, a single elongated pivot pin 25, and two coaxial pivot pins 27, one for each of the two bell crank levers 11. The prime mover 28 is supported exclusively by the toggle links and levers, i.e., by the pivot pin 25 and by the pivot pins 27.

Figure 4:
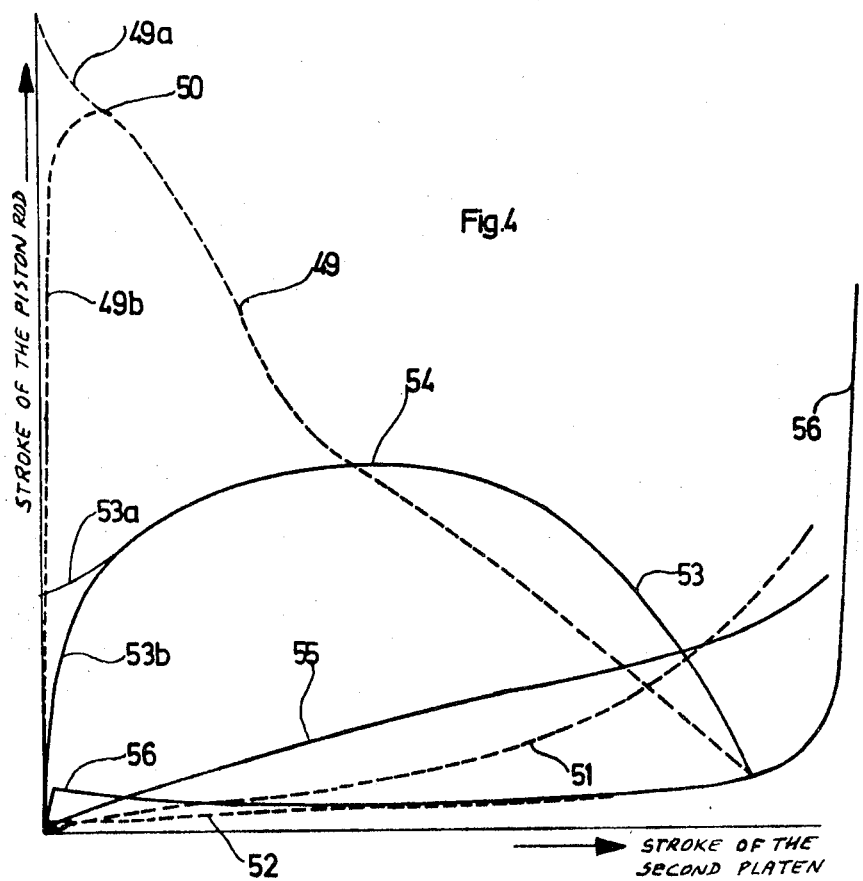
FIG. 4 is a diagram with curves representing the speed of movement of the movable platen and certain other characteristics of injection molding machines which employ conventional clamping apparatus and the apparatus of FIGS. 1–3.
Figure 4A:
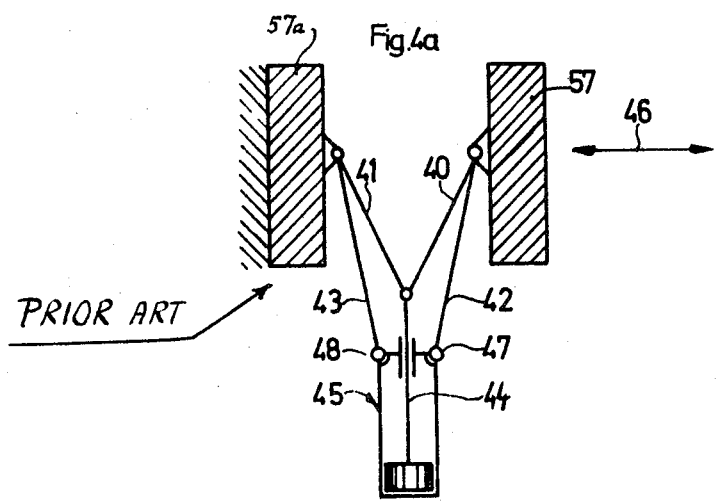
FIG. 4a is a diagrammatic fragmentary vertical sectional view of an injection molding machine which is provided with a conventional clamping apparatus.

Prior to discussing the diagram of FIG. 4, reference will be had to FIG. 4a which illustrates a conventional apparatus for reciprocating a movable platen 57 relative to a fixed platen 57a in directions indicated by a double-headed arrow 46. The toggle links are shown at 40 and 41, the levers at 42, 43, the pivots where the levers 42, 43 are respectively connected to the cylinder 45 of a hydraulic motor at 47, 48 and the piston rod at 44. The axis of the piston rod 44 is normal to the direction indicated by the arrow 46 in all positions of the movable platen 57. It will be noted that the levers 42, 43 of the conventional apparatus are not directly coupled to each other but are connected to two discrete parallel (not coaxial) pivot pins 47, 48 on the cylinder 45.

FIG. 4a shows by solid lines changes in the speed of movement of the movable platen 2 while the piston rod 33 moves with reference to the cylinder 29, the changes in closing force which is furnished by the prime mover 28 during movement of the platen 2 toward the second position of FIG. 2, and the ratio of the extent of movement of the piston rod 33 to the extent of movement of the platen 2. The broken-line curves of FIG. 4a indicate the corresponding values for the conventional clamping apparatus of FIG. 4a.

The changes in speed of the movable platen 57 of the conventional apparatus of FIG. 4a are indicated by the curves 49b and 49. It will be seen that the speed of the platen 57 rises abruptly from zero speed to maximum speed during the initial stage of movement of the piston rod 44 in an upward direction, as viewed in FIG. 4a. The peak value 50 of the speed of the platen 57 is reached almost immediately after the piston rod 44 leaves the starting position of FIG. 4a. By using concrete values, the peak value 50 can reach 105 centimeters per second before the movable platen 57 completes one percent of its stroke toward the position corresponding to that of the movable platen 2 shown in FIG. 2. From there on, the speed of movement of the platen 57 in the conventional machine decreases very rapidly as indicated by the portion 49 of the speed curve. Such rapid rise and rapid decrease in the speed of the movable platen 57 are attributable to the relatively small ratio between the stroke of the piston rod 44 and the stroke of the platen 57; this ratio is indicated by the broken-line curve 51 of FIG. 4. The curve 51 indicates that the acceleration of movable platen 57 necessitates the application of a considerable force. The changes in the magnitude of such force for the conventional apparatus of FIG. 4a are represented by the broken-line curve 52 of FIG. 4. The curve 52 shows that the force rises very gradually from a relatively small initial value.

The speed of the movable platen 2, the ratio of the strokes of piston rod 33 and platen 2, and the changes in the magnitude of closing and sealing force are more satisfactory in the machine which employs the clamping apparatus of FIGS. 1 and 2. As indicated by the curve 53b, 53 of FIG. 4, the accelerating of the platen 2 as a function of the extent of movement from the first position of FIG. 1 is more gradual (compare with the curve 49b, 49) and the peak value 54 of such speed is less than half the peak value (50) of the speed of platen 57 in the conventional clamping apparatus. Referring to the aforementioned example, the maximum speed (54) of the platen 2 will be about 50 centimeters per second. Furthermore, the speed of the platen 2 rises to and decreases from such maximum value at a substantially constant rate and gradually to thus avoid undesirable peaks of acceleration or deceleration. This brings about savings in time and prevents excessive stressing of the links, levers, prime mover, tie rods and movable platen. The platen 2 reaches the maximum speed (54) when it completes about 45 percent of its stroke toward the position of FIG. 2, i.e., substantially midway between the positions of FIGS. 1 and 2. Such advantageous changes in the speed of the platen 2 influence the other values which were discussed in connection with the apparatus of FIG. 4a. Thus, the ratio of the stroke of the piston rod 33 to the stroke of the platen 2 (curve 55 of FIG. 4) is relatively high all the way to the point when the toggle links 8, 9 approach the positions of FIG. 2. The changes in closing force are represented by the curve 56 of FIG. 4; it will be seen that the closing force is greater at the start of movement of the platen 2 from the position of FIG. 1 and is thereupon constant during a substantial part of a working stroke of the platen 2 to rise rapidly when the platen approaches the position of FIG. 2. It is desirable to furnish a relatively large closing force at the very start of movement of the platen 2 toward the position of FIG. 2 and at the very end of movement toward the position of FIG. 1 (compare the left-hand portions of the curves 52 and 56 in FIG. 4).

The curves 49a, 53a which are shown by thin broken and solid lines respectively indicate theoretical acceleration of the platens 57 and 2 from their first positions, i.e., by disregarding the inertia of the masses of moving parts and friction.

The generation of a substantial closing force (curve 56 of FIG. 4) immediately after the platen 2 starts its movement toward the position of FIG. 2 is due to the novel mounting of the prime mover 28, i.e., to the fact that the axes of the tie rods 12 (straight line path for the platen 2) and the axis of the piston rod 33 make an acute angle which is preferably less than 71° and most preferably less than 45°. Thus the force furnished by the prime mover 28 in response to admission of pressurized fluid via port 31 has a substantial component which acts on the platen 2 in a direction to move this platen toward the support 3. This is in direct contrast to the teaching of prior art, as evidenced by the construction of the conventional clamping apparatus shown in FIG. 4a, wherein the direction of movement of the piston rod (44 in FIG. 4a) is always normal to the direction of movement of the movable platen (57). Combined with the feature that the angle between the toggle links 8, 9 in the first position of the platen 2 is less than 90°, the arrangement of FIGS. 1 and 2 insures that the force acting on the pivot pin 25 during the initial stage of movement of the platen 2 from the position of FIG. 1 has a component which acts in the longitudinal direction of the tie rods 12 and is greater than the component which is normal to the tie rods. The component which in the longitudinal direction of tie rods 12 would be smaller than the other component if the angle between the toggle lines 8, 9 in the first position of the platen 2 would exceed 90°. Another advantage of toggle links which make an acute angle when the second position is that the stroke of the second platen is longer. This will be readily understood with reference to FIGS. 1 and 2; were the angle between the links 8, 9 shown in FIG. 1 an obtuse angle, the platen 2 would cover a shorter distance in response to movement of the links 8, 9 to the solid-line positions of FIG. 2.

The clamping apparatus of FIGS. 1 and 2 can operate properly and constitutes an improvement over the conventional apparatus of FIG. 4a even if the angle between the axis of the piston rod 33 and the axis of a tie rod 12 is only slightly less than 90°. However, in actual practice, and by taking into consideration such factors as friction and the inertia of moving parts, the effect is much more satisfactory if the angle between the axis of the piston rod 33 and the axis of a tie rod 12 (in the first position of the movable platen 2) is substantially less than 90°, preferably less than 71 and most preferably less than 45°. The efficiency of the improved apparatus increases with increasing value of the sine of the angle 90° minus alpha wherein alpha is the angle between the axis of the piston rod 33 a plane which is normal to the tie rods 12. When the angle alpha increases to 20°, i.e., when the angle between the axis of the piston rod 33 and a tie rod 12 is 70° or less, the closing force (curve 56 in FIG. 4) becomes highly satisfactory during movement of the platen 2 toward its second position to close the mold of the injection molding machine. The closing force is particularly satisfactory when the axis of the piston rod 33 is substantially normal to the line connecting the pivot pins 23, 26 at the ends of the bell crank lever 11, i.e., of that lever which is not directly connected to the movable platen 2.

An important advantage of the feature that the first portion or cylinder 29 of the primer mover 28 is connected with the lever 11 by a single pivot 27 or by two coaxial pivots (see FIG. 3) is that the prime mover is not subjected to any appreciable shearing or like forces while the platen 2 moves from the position of FIG. 1 to the position of FIG. 2 or vice versa. Such transverse forces are an important factor in the design of the prime mover for conventional clamping apparatus of the type shown in FIG. 4a (see the parallel pivot pins 47 and 48). In the clamping apparatus of the present invention, the cylinder 29 is pivotable with reference to the lever 11 about a single axis (pivot pin 27) and, therefore, this cylinder cannot be subjected to any appreciable shearing or other deforming stresses. Of course, if the apparatus of the present invention employs an exceptionally rugged prime mover which is capable of withstanding substantial shearing or like deforming stresses, the provision of a single pivot (pin 27) between the lever of levers of the closing apparatus and the cylinder of the prime mover is of lesser importance. However, when the prime mover employs a hydraulic or pneumatic cylinder and piston unit, the shearing and like stresses are sufficiently important to warrant the mounting of the cylinder in a manner as shown in FIGS. 1 to 3, i.e., in such a way that the lever 11 can pivot with reference to the cylinder 29 about a single pivot axis or vice versa.

The positions of the cylinder 29 and piston rod 33 can be reversed, i.e., the cylinder can be pivotally connected with the pin 25.

An advantage of the provision of a boomerang-shaped bell crank lever (11) with substantially straight arms (11a, 11b) which make an angle of 90° or close to 90° is that the levers 10, 11 need not overlap the toggle links 8, 9. This is often desirable to insure satisfactory utilization of space, especially if the clamping apparatus comprises several pairs of levers and/or toggle links (see FIG. 3)

Figure 5:
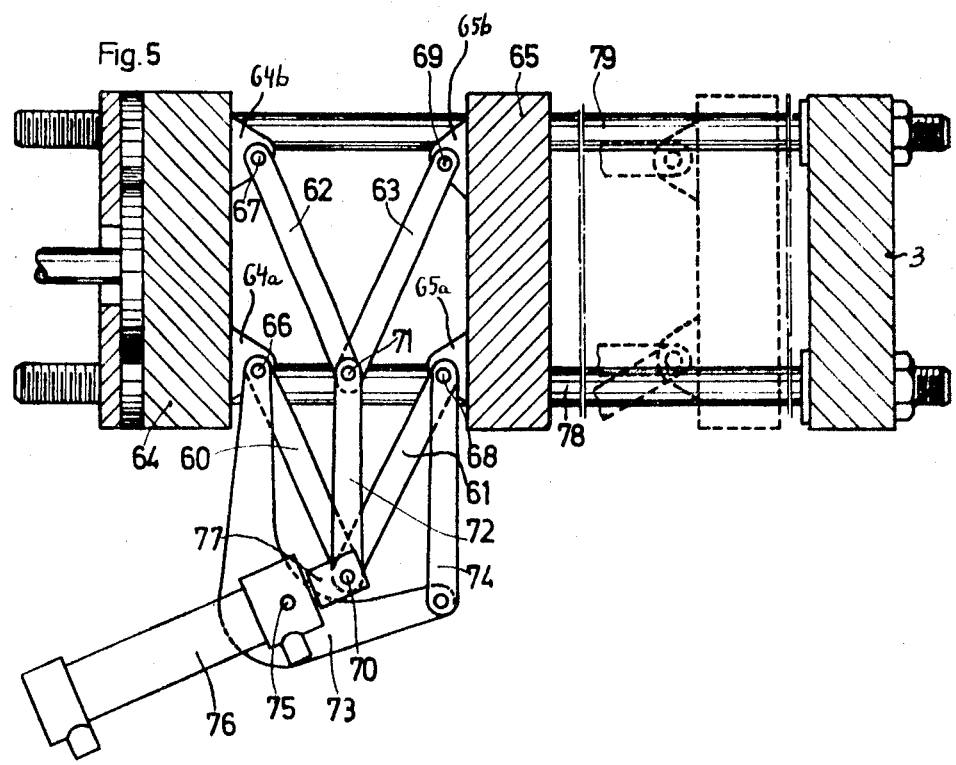
FIG. 5 is a fragmentary longitudinal vertical sectional view of an injection molding machine and a side elevational view of a clamping apparatus which is constructed and assembled in accordance with a second embodiment of the invention, the movable platen of the machine being shown in a first position by solid lines and in a second position by broken lines.

FIG. 5 illustrates a portion of an injection molding machine (with first and second platens 64, 65 and guide means including tie rods 78, 79) which embodies a modified clamping apparatus having toggle links 60, 61 and levers 74, 73 which respectively correspond to the parts 8, 9 and 10, 11 of FIGS. 1 and 2. The cylinder 76 of the prime mover is pivoted to an intermediate portion of the bell crank lever 73 by a pin 75, and the outer end of the piston rod 77 of the prime mover is pivoted to the pin 70 at the junction of the toggle links 60 and 61. The pivot pins 66, 68 for the outer ends of the links 60, 61 are mounted in first or lower brackets 64a, 65a of the platens 64, 65. These platens further comprise upper bearing brackets 64b, 65b for horizontal pivot pins 67, 69 serving to pivotally support the outer ends of two additional toggle links 62, 63 which are respectively parallel to the links 60, 61 and are connected to each other at their inner ends to form a second junction (see the pin 71). The pivot pins 70 and 71 are coupled to each other by a connector link 72. The length of all four toggle links 60–63 is the same. As shown in FIG. 5, the angle between the toggle links 60, 61 or 62, 63 in the first (solid-line) position of the movable platen 65 is substantially less than 90° and the angle between the axis of the piston rod 77 of the prime mover (preferably a hydraulically operated cylinder and piston unit) and the axes of the tie rods 78, 79 is also substantially less than 90°. The outer ends of the levers 73, 74 are pivotally connected to the lower brackets 64a, 65a, i.e., to those brackets which are nearer to the prime mover.

The structure of FIG. 5 is desirable when the clamping apparatus must furnish a substantial closing force and when the stresses upon the planes 64, 65 and tie rods 78, 79 must be distributed more uniformly. For example, the clamping apparatus of FIG. 5 can be used when the cavity defined by the mold sections respectively carried by the support 3 and platen 65 is of such configuration that different portions of the platen 65 are subjected to stresses of different magnitude while the clamping apparatus furnishes the closing and sealing forces. The feature that the bearing brackets 64a, 64b and 65a, 65b are located at a considerable distance from each other and that the apparatus comprises two pairs of toggle links 60, 61 and 62, 63 which are respectively pivoted to the uper and lower bearing brackets reduces the likelihood of excessive bending stresses upon the tie rods 78, 79 and prevents a tilting of the movable platen 65. Furthermore, since the levers 73, 74 are pivoted to the lower bearing brackets 64a, 65a, the prime mover is readily accessible below the path for the movable platen 65.

FIGS. 6 and 6a illustrate portions of an injection molding machine with stationary and movable platens 91, 92 and a third clamping apparatus which employs two straight levers 85, 86. The positions of the movable platen 92 in FIGS. 6 and 6a respectively correspond to the first and second positions of the platen 2 shown in FIGS. 1 and 2. The two pairs of toggle links 80–81 and 82–83 and the connector link 84 respectively correspond to the parts 60–61, 62–63 and 72 of the apparatus shown in FIG. 5. The pivot pins for the outer ends of the toggle links 80–83 are respectively shown at 89, 89a, 89b, 89c, the pivot pin at the junction of the links 80, 81 at 94, the pivot pin at the junction of links 82, 83 at 94a, the pivot pin which connects the levers 85, 86 to each other at 93, and the pivot pins which connect the outer ends of the levers 85, 86 to the lower brackets of the platens 91, 92 at 90 and 90a.

It will be noted that the outer ends of the levers 85, 86 are pivotable about axes (defined by the pivot pins 90, 90a) which do not coincide with the pivot axes for the outer ends of the links 80, 81 or 82, 83. Furthermore, the cylinder 88 of the prime mover is pivoted to the lever 85 by the aforementioned pin 93 which simultaneously connects the lever 85 to to the lever 86. The cylinder 88 is preferably a double-acting hydraulic cylinder and the piston rod 87 is connected to the pin 94. An advantage of the apparatus of FIGS. 6 and 6a is that it does not have to use the pivot pin 75 of FIG. 5. The provision of discrete pivot pins 90, 90a for the outer end of the levers 85, 86 contributes to more uniform distribution of stresses.

A feature of the clamping apparatus which is shown in FIGS. 7 and 7a is that the length of the lever 98 equals the length of the lever 97. Otherwise, the clamping apparatus of FIGS. 7 and 7a is identical with the apparatus of FIGS. 1 and 2. The toggle links are shown at 95, 96, the cylinder of the prime mover at 99, and the pivot pin between the cylinder 99 and an intermediate portion of the lever 97 at 100. The cost of the apparatus of FIGS. 7 and 7a is rather low because the levers 97 and 98 are not identical size and shape. The character 98a denotes a hole or bore which is provided in the lever 98 to receive the pivot pin 100 if the lever 98 is to be used in place of the lever 97.

The length of the toggle link 95 equals that of the toggle links 96.

FIGS. 8 and 8a illustrate the platens 109, 110 of an injection molding machine which employs a further clamping apparatus for the movable platen 110. This apparatus is more compact than the previously described apparatus because the cylinder 105 of the prime mover is connected to the intermediate portion of the bell crank lever 106 by a pivot pin 108 located at a point which is remotest from the junction between the toggle links 101, 102, i.e., which is remotest from the outer end of the piston rod 105a. The characters 103, 104 respectively denote the toggle links of the second pair, the straight lever is shown at 107, and the pivot pin which connects the inner ends of the levers 106, 107 to each other is shown at 111. It will be noted that the clamping apparatus of FIGS. 8 and 8a is similar to the apparatus of FIG. 5 excepting that the outer ends of the levers 106, 107 are pivotable on separate pins 112, 113 and that the cylinder 105 does not extend beyond the apex of the bell crank lever 106. When the platen 110 assumes the first position shown in FIG. 8, the pivot pin 108 is located substantially midway between the platens 109, 110. The bell crank lever 106 does not have to extend well below the lower tie rods (not shown in FIGS. 8 and 8a), even when the platen 110 dwells in the first position of FIG. 8, because the outer ends of the levers 106, 107 are coupled to the platens 109, 110 substantially midway between the pivots for the outer ends of the upper links 101, 102 and lower links 103, 104.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptions should and are intended to be comprehended within the meaning and range of equivalence of the claims.

What is claimed as new and desired to be protected by Letters Patent is:

1. In an injection molding machine, the combination of a first platen; elongated guide means extending from said first platen; a second platen movable with reference to said guide means along a first straight line path between a first position nearer to and a second position remote from said first platen; and apparatus for moving said second platen, comprising first and second toggle links making with each other an acute angle in the first position of said second platen and having first ends respectively pivoted to said first and second platens and second ends pivoted to each other to form a first junction, first and second levers having first ends respectively pivoted to said first and second platens and second ends pivoted to each other to form a second junction, said first lever being a bell crank having a concave side facing said second platen and the distance between said first and second ends of said first lever being greater than the distance between said first and second ends of said second lever, and a prime mover including a first portion pivotally connected with said first lever intermediate said first and second ends thereof and with said second junction, said prime mover further including a second portion pivotally connected to said first junction and movable relative to said first portion along a second straight line path which makes an angle of less than 71° with said first path in the first position of said second platen to thereby move said second platen toward said second position by displacing said first junction in a direction to enlarge the angle between said links.

2. The combination of claim 1, wherein the angle between said first and second paths in the first position of said second platen is less than 45 degrees.

3. The combination of claim 1, wherein the second ends of said levers are pivotable about said axis.

4. The combination of claim 1, wherein said levers are of identical length.

5. The combination of claim 4, further comprising pivot means articulately connecting said first portion of said prime mover to said first lever intermediate said first and second ends of said first lever.

6. The combination of claim 5, wherein said links are of identical length which is less than the length of said levers.

7. The combination of claim 1, wherein the distance between the said first and second ends of said first lever is greater than the distance between said first and second ends of said second lever and wherein said links are of identical length, and further comprising pivot means articulately connecting said first portion of said prime mover to said first lever intermediate the first and second ends of said first lever.

8. In an injection molding machine, the combination of a first platen; elongated guide means extending from said first platen; a second platen movable with reference to said guide means along a first straight line path between a first position nearer to and a second position remote from said first platen; and apparatus for moving said second platen, comprising first and second toggle links making with each other an acute angle in the first position of said second platen and having first ends respectively pivoted to said first and second platens and second ends pivoted to each other to form a first junction, first and second levers having first ends respectively pivoted to said first and second platens and second ends pivoted to each other to form a second junction, the first ends of said first link and said first lever being pivotable with reference to said first platen about a first common pivot axis, and the first ends of said second link and said second lever being pivotable with reference to said second platen about a second common pivot axis which is parallel to said first axis, and a prime mover including a first portion pivotally connected with one of the two elements including said first lever and said second junction and a second portion pivotally connected to said first junction and movable relative to said first portion along a second straight line path which makes an angle of less than 71° with said first path in the first position of said second platen to thereby move said second platen toward said second positon by displacing said first junction in a direction to enlarge the angle between said links.

9. The combination of claim 8, wherein said bell crank has two arms making an angle of about 90°.

10. The combination of claim 9, wherein said arms of said bell crank have outer ends respectively constituting the first and second ends of said first lever and further comprising pivot means articulately connecting said first lever with said first portion of said prime mover in the region of the apex of said bell crank, said outer ends being of identical length.

11. The combination of claim 8, wherein said apparatus further comprises third and fourth links respectively parallel to said first and second links and having first end respectively pivoted to said first and second platens and second ends pivoted to each other to form a third junction.

12. The combination of claim 11, further comprising a connector link coupling said first junction with said third junction.

13. The combination of claim 11, wherein said first ends of said first link and said first lever are pivotable with reference to said first platen about a first pivot axis and the first ends of said second link and said second lever are pivotable with reference to said second platen about a second pivot axis which is parallel to said first axis.

14. The combination of claim 13, wherein the first ends of said third and fourth links are respectively pivotable with reference to said first and second platens about third and fourth pivot axes which are parallel to said first and second axes.

15. The combination of claim 8, wherein said first portion of said prime mover is a double-acting cylinder and said second portion includes a piston rod having a piston which is reciprocable in said cylinder.

16. The combination of claim 8, wherein said guide means comprises a plurality of parallel tie rods and said first and second portions of said prime mover are respectively pivotable relative to said first junction and said first lever, and further comprising a support remote from said first platen and connected with said tie rods, a first mold section mounted on said support and facing said second platen, and a second mold section mounted on said second platen and facing said first mold section, said second mold section engaging said first mold section in the second position of said second platent.

17. The combination of claim 1, wherein the angle between said first and second paths in the first position of said second platen is less than 45°.

* * * * *